United States Patent
Udagawa

[11] Patent Number: 5,215,316
[45] Date of Patent: Jun. 1, 1993

[54] METAL LAMINATE GASKET FOR OPEN DECK TYPE ENGINE

[75] Inventor: Tsunekazu Udagawa, Ichikawa, Japan

[73] Assignee: Ishikawa Gasket Co., Ltd., Tokyo, Japan

[21] Appl. No.: 858,297

[22] Filed: Mar. 26, 1992

[30] Foreign Application Priority Data

Apr. 5, 1991 [JP] Japan ............................ 3-022061[U]

[51] Int. Cl.⁵ .............................................. F16J 15/08
[52] U.S. Cl. .................. 277/235 B; 277/234; 277/236
[58] Field of Search ............... 277/235 B, 233, 234, 277/236

[56] References Cited

U.S. PATENT DOCUMENTS

| | | | |
|---|---|---|---|
| 4,714,260 | 12/1987 | Udagawa | 277/235 B |
| 4,767,124 | 8/1988 | Udagawa | 277/235 B |
| 4,968,045 | 11/1990 | Abe et al. | 277/235 B |
| 5,022,661 | 6/1991 | Nakasone | 277/235 B X |
| 5,022,662 | 6/1991 | Yasui | 277/235 B |
| 5,054,795 | 10/1991 | Udagawa et al. | 277/235 B X |
| 5,062,649 | 11/1991 | Udagawa | 277/235 B |
| 5,082,298 | 1/1992 | Uchida et al. | 277/235 B |

FOREIGN PATENT DOCUMENTS

| | | | |
|---|---|---|---|
| 0003465 | 1/1985 | Japan | 277/235 B |
| 2241025 | 8/1991 | United Kingdom | 277/235 B |

Primary Examiner—Thomas B. Will
Assistant Examiner—James K. Folker
Attorney, Agent, or Firm—Kanesaka and Takeuchi

[57] ABSTRACT

A metal laminate gasket of the invention is designed to be installed on an open deck type engine. The gasket is basically formed of first and second metal plates. A thin metal plate is installed between the metal plates to be situated above a main body or frame outside cylinder walls of the engine. Accordingly, when the gasket is tightened, high surface pressure is formed on the main body outside the water passage to securely seal outside the water passage.

9 Claims, 2 Drawing Sheets

METAL LAMINATE GASKET FOR OPEN DECK TYPE ENGINE

BACKGROUND OF THE INVENTION AND RELATED ART STATEMENT

The present invention relates to a metal laminate cylinder head gasket for an open deck type engine.

A light weight automobile engine has been developed to provide high power. In order to satisfy this demand, a cylinder block may be made of an aluminum alloy, and in some cases, formed by die casting to become an open deck type, so that the molded cylinder block can be easily removed from the die.

One example of the open deck type cylinder block 10 is shown in FIG. 1. The cylinder block 10 is formed integrally as one unit, and includes cylinder walls 12 for defining cylinder bores 11 therein and an outer frame or main body 13. The cylinder walls 12 are connected together at connecting portions 14. The cylinder walls 12 are also connected to the outer frame 13 at bottom portions 14' thereof, and form therebetween a space 15. Cooling liquid or water circulates through the space 15 for cooling the cylinder bores 11.

The outer frame 13 includes bolt holes 16 for connecting with a cylinder head (not shown). Also, an oil hole 17 is formed in the outer frame 13 for circulating oil. As shown in FIG. 2, cylinder liners 18 may be installed inside the cylinder walls 12.

In order to seal the open deck type engine, a gasket 20 is used. The gasket 20 is formed of an upper plate 21, a middle plate 22, and a lower plate 23. The upper plate 21 includes a water hole 21a, a curved portion 21b for defining the cylinder bore 11, and a flange 21c. The middle plate 22 includes a water hole 22a, and beads 22b, 22c extending along the space 15 for sealing at side portions of the space 15. The lower plate 23 includes a water hole 23a, and a bead 23b extending around the cylinder bore 11 for sealing therearound.

In the conventional gasket 20, coatings may be formed on the entire outer surfaces of the gasket for sealing and filling out small scratches formed on the cylinder block and the cylinder head. Further, soft seal coatings may be formed on the entire surfaces of the middle plate to prevent liquid from flowing between the plates.

However, in case the soft seal coating is formed on the entire outer surfaces of the middle plate, a part of the coating formed on the beads may wear or be broken, because the cylinder wall 12 vibrates severely.

In U.S. Pat. No. 4,968,045, a plate for forming a gasket is made so that a portion of the plate for contacting cooling liquid does not have a seal coating. As a result, the seal coating does not enter into the cooling liquid, and consequently, clogging of a water circulating system of an engine is prevented.

In the open deck type engine, the cylinder walls vibrate severely, so that if the coating is formed on the cylinder wall, the coating may wear or break. None of the prior art gaskets solves this problem.

Accordingly, one object of the present invention is to provide a metal laminate gasket for an open deck type engine, wherein an area around a water hole is securely sealed.

Another object of the invention is to provide a metal laminate gasket as stated above, which can be easily and economically manufactured.

Further objects and advantages of the invention will be apparent from the following description of the invention.

SUMMARY OF THE INVENTION

In the present invention, a gasket is installed in an engine with an open deck type cylinder block. The cylinder block includes a plurality of cylinder walls for defining cylinder bores, a main body or frame and a water passage for surrounding the cylinder walls inside the main body.

The gasket basically comprises first and second metal plates, and a thin metal plate situated between the metal plates. The thin metal plate extends substantially above the main body outside the cylinder walls. Accordingly, when the gasket is tightened, high surface pressure is formed on the main body outside the water passage to thereby securely seal outside the water passage.

The gasket further includes a plurality of first sealing means or inner beads located on or above the cylinder walls for sealing around the cylinder bores, and second sealing means or an outer bead located on or above the main body for surrounding the water passage to seal therearound. Another bead may be formed above the cylinder walls to surround the water passage between the two beads. Preferably, the thin metal plate is located outside the outer bead.

In case a soft coating is formed on the entire surface of the middle plate, the inner beads located on the cylinder wall contact the soft coating. Since the cylinder walls are not securely held by the bolts, when the engine is operated, the cylinder walls vibrate severely. As a result, the soft coating located above the cylinder walls wears and causes leakage thereat.

In the present invention, the thin metal plate is located on the main body, not on the cylinder walls. Therefore, even if the cylinder walls vibrate severely, the thin metal plate is not affected by the vibration. Also, the thin metal plate increases the surface pressure on the main body. Therefore, leakage of water from the water passage is prevented.

Further, in case the thin metal plate is located on the main body, when the gasket is tightened, the surface pressure on the main body can be increased without affecting the surface pressure applied onto the cylinder walls. Namely, balance of the surface pressures applied on the main body and the cylinder walls can be controlled by selecting the thickness of the thin metal plate.

Fox example, when the thin metal plate is located on the side of the bead, the surface pressure on the bead is reduced, because the thin metal plate operates as a surface pressure regulation plate. On the other hand, when the thin metal plate is located on the opposite side of the bead, the surface pressure on the bead is not changed by the thin metal plate. However, the balance of the surface pressures on the main body and the cylinder walls is changed by the thin metal plate.

If desired, a soft seal coating may be formed on one or both sides of the thin metal plate. In this case, the soft seal coating must not expose the water passage.

DETAILED DESCRIPTION OF PREFERRED EMBODIMENTS

Figure 1:
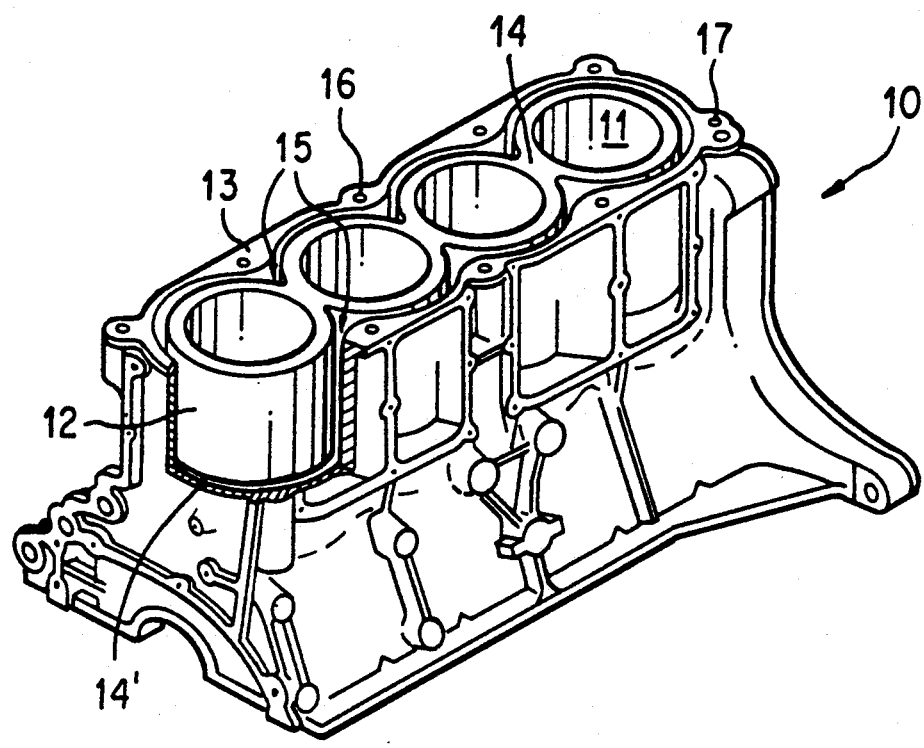
FIG. 1 is a perspective view of an open deck type engine block.
Figure 2:
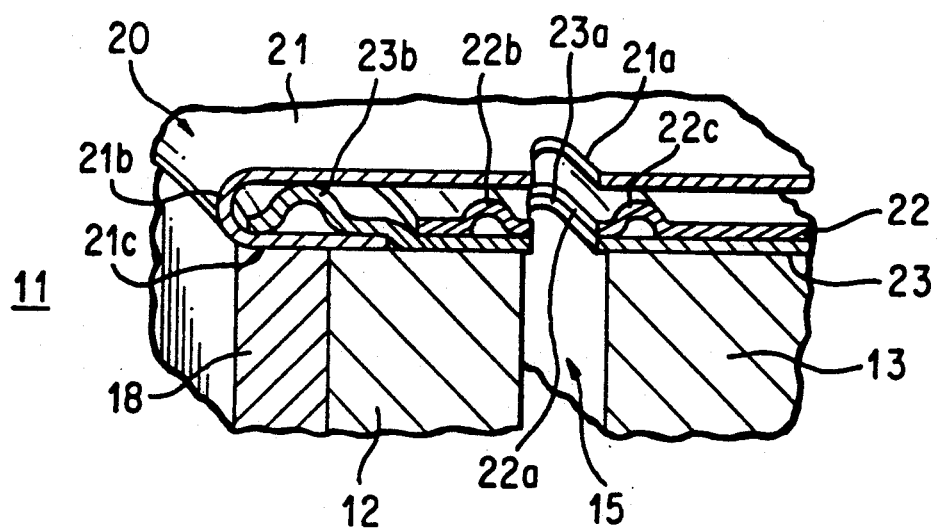
FIG. 2 is a perspective section view of a conventional gasket installed on an engine block.
Figure 3:
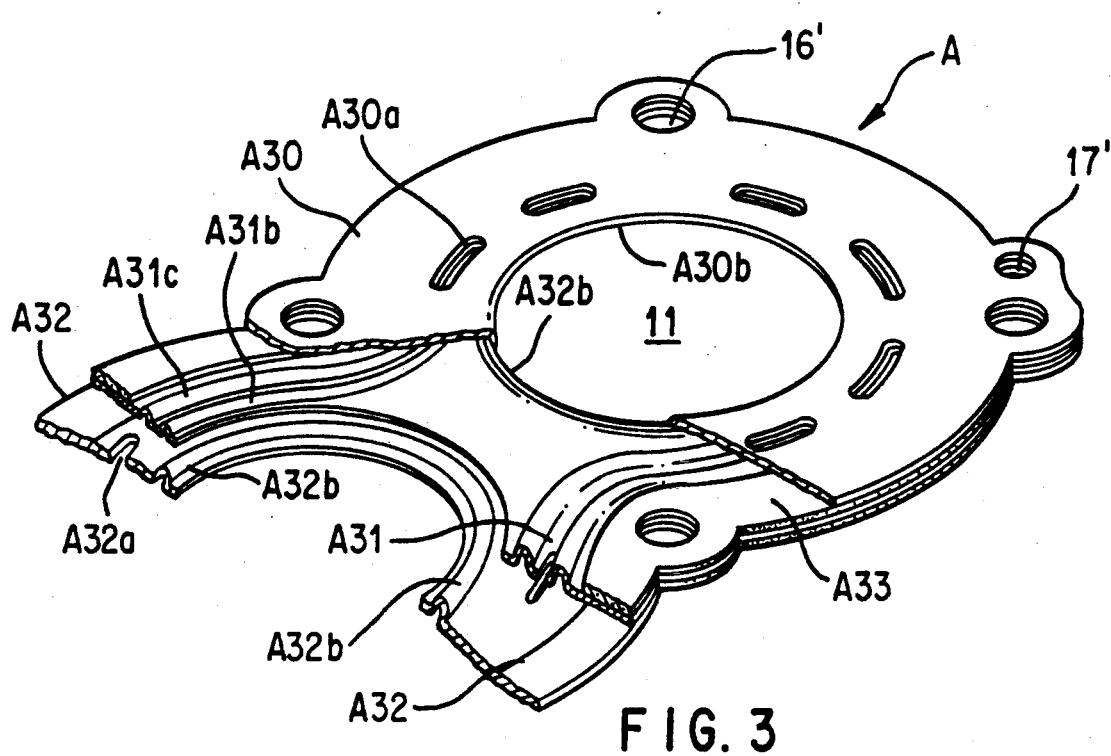
FIG. 3 is a perspective view of a first embodiment of a gasket of the present invention, wherein parts of the gasket are partly cut.

Referring to FIG. 3, a gasket A of the invention is shown. The gasket A is designed to be installed on an engine 10 as shown in FIG. 1.

The gasket A is formed of an upper plate A30, a middle plate A31, and a lower plate A32. The upper plate A30 includes a plurality of water holes A30a, curved portions A30b for defining the cylinder bores 11, and flanges A30c (not shown).

The middle plate A31 includes a plurality of water holes A31a (not shown), a bead A31b and a bead A31c. The bead A31b is situated above the cylinder walls 12 and extends along the space 15 for cooling water. The bead A31c is situated above the frame 13 and extends along and outside the space 15. When the gasket A is tightened, the beads A31b, A31c provide surface pressure for sealing around the space 15.

The lower plate A32 includes a plurality of water holes A32a, and beads A32b to seal around the cylinder bores 11. The bead A32b is located above the flange of the upper plate A30.

The gasket A further includes a thin metal plate A33 situated above the middle plate A31 outside the bead A31c. The thin metal plate A33 provides surface pressure on the frame 13 when the gasket A is tightened. In the gasket A, bolt holes 16' and an oil hole 17' are also formed.

In the gasket A, the thickness of the thin metal plate A33 is between 0.02-0.15 mm, and the thin metal plate may be made of any kind of metals for the gasket. The other plates may have thicknesses between 0.15-0.3 mm.

When the gasket A is situated between the cylinder block 10 and a cylinder head (not shown) and is tightened, the beads A32b are compressed to seal around the cylinder bores 11, and the beads A31b, A31c are compressed to seal around the space 15. Since the thin metal plate A33 is located on the middle plate A31, high surface pressure is formed on the frame 13. Therefore, leakage of water from the space 15 is substantially prevented.

In the gasket A, the thin metal plate A33 is situated above the middle plate A31 outside the bead A31c. Therefore, the metal plate A33 operates as a surface pressure regulation plate for the beads A31b, A31c, A32b. When the gasket A is tightened, therefore, the surface pressures on the frame 13 and the cylinder walls 12 and the balance thereof can be controlled by selecting the thickness of the thin metal plate A33.

In case the thin metal plate A33 is situated under the middle plate A31, the metal plate A33 also affects the surface pressure for the beads A31b, A31c, A32b.

Therefore, the thin metal plate A33 helps secure sealing around the water passage. Also, surface pressures formed on the beads or on the cylinder walls can be properly controlled by selecting the thickness of the thin metal plate A33.

Further, in case the thicknesses or hardnesses of the middle plate A31 and the lower plate A32 are changed, surface pressures formed on the beads A31b, A31c and the bead A32b can be controlled. The desired surface pressures are formed on the beads A31b, A31c, A32b.

Figure 4:
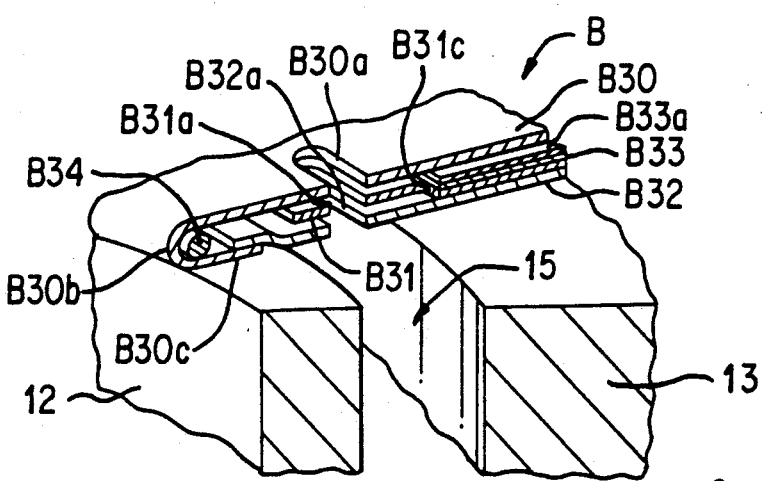
FIG. 4 is a perspective section view of a second embodiment of the gasket, wherein the gasket is installed on the engine block.
Figure 5:
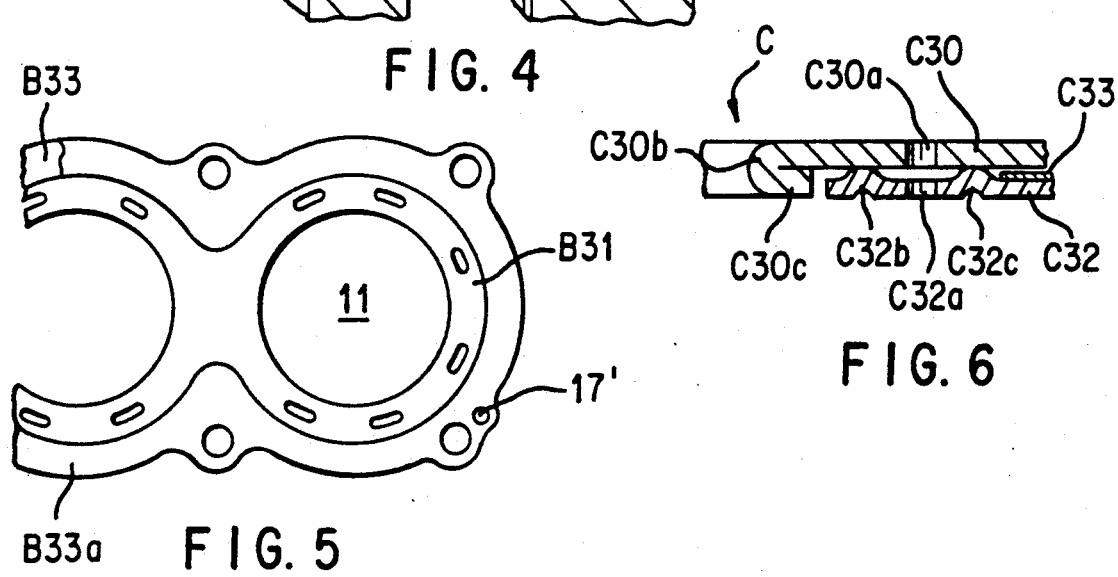
FIG. 5 is a plan view of a part of a middle plate of the gasket shown in FIG. 4.

FIGS. 4 and 5 show a second embodiment B of the gasket of the invention. The gasket B includes an upper plate B30 with water holes B30a, curved portions B30b and flanges B30c, a middle plate B31 with water holes B31a, and a lower plate B32 with water holes B32a, as in the gasket A.

In the gasket B, the middle plate B31 is provided with an inclined wall or embossment B31c situated above the frame 13, but the middle plate B31 does not have a bead on the cylinder wall 12. Also, the lower plate B32 does not have a bead on the cylinder wall 12, and instead, a wire ring B34 is installed for sealing around the cylinder bore.

Further, a thin metal plate B33 with a soft coating B33a is placed on the middle plate B31. The soft coating B33a may be silicone resin, fluorine resin, silicone gum, fluorine gum, NBR and so on.

In the gasket B, the width of the cylinder wall 12 is made relatively narrow. Therefore, the wire ring B34 is installed above the cylinder wall 12. The wire ring B34 and the embossment B31c can securely seal around the cylinder bores and the water passage.

In the gasket B, since the soft coating B33a is formed on the thin metal plate B33, sealing between the plates B30, B33 is enhanced. The coating B33a may be formed on both sides of the thin metal plate B33. Also, in the gasket B, the thin metal plate B33 may be formed under the middle plate B31. The gasket B operates as in the gasket A.

Figure 6:
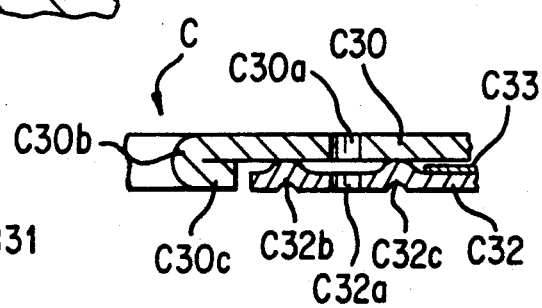
FIG. 6 is a section view of a third embodiment of the gasket of the invention.

FIG. 6 shows a third embodiment C of the gasket of the invention. The gasket C includes an upper plate C30 with water holes C30a, curved portions C30b and flanges C30c, a thin metal plate C33, and a lower plate C32 with water holes C32a and beads C32b, C32c.

In the gasket C, the flange C30c and the bead C32b are located on the cylinder wall 12 to seal around the cylinder bore, and the bead C32c is located on the frame 13. The water holes are securely sealed by the beads C32b, C32c. The gasket C operates as in the gasket A.

In the present invention, the thin metal plate is situated between the plates and located above the frame and outside the cylinder wall. Therefore, when the gasket is tightened, the surface pressure of the gasket above the frame is increased to seal outside the water passage. Since the thin metal plate is not formed above the cylinder walls, even if the cylinder walls vibrate severely, it does not affect the sealing outside the water passage.

Further, the surface pressures on the frame and the cylinder walls can be easily controlled by selecting the thickness of the thin metal plate. Also, the surface pressures on the beads around the cylinder bore and water passage can be easily controlled.

While the invention has been explained with reference to the specific embodiments of the invention, the explanation is illustrative, and the invention is limited only by the appended claims.

What is claimed is:

1. A metal laminate type cylinder head gasket adapted to be installed in an engine with an open deck type cylinder block, said cylinder block having a plurality of cylinder walls for defining cylinder bores, said cylinder walls being connected to each other and having bottom portions, a main body surrounding the cylinder walls and connected thereto at the bottom portions, and a water passage for completely surrounding side portions of the cylinder walls inside the main body, said gasket comprising, first and second metal plates extending substantially throughout an entire area of the engine, a plurality of first sealing means located above the cylinder walls for sealing around the cylinder bores, second sealing means located above the main body for surrounding the water passage to seal therearound, said cylinder walls and first sealing means being located inside the second sealing means, and a thin metal plate situated between the metal plates, said thin metal plate extending above the main body and being located only radially outside the second sealing means relative to the cylinder bores for surrounding the water passage so that when the gasket is tightened, high surface pressure is formed on the main body outside the water passage to thereby securely seal outside the water passage.

2. A gasket according to claim 1, further comprising a third metal plate situated between the first and second metal plates, said thin metal plate contacting one of outer surfaces of the third metal plate.

3. A gasket according to claim 2, further comprising a seal coating formed on at least one surface of the thin metal plate without exposing to the water passage to seal between the plates.

4. A gasket according to claim 2, wherein said first plate includes a main portion, curved portions extending from the main portion to be situated on the cylinder walls for surrounding the respective cylinder bores and flanges extending from the respective curved portions in the directions away from the respective cylinder bores, said second plate being situated under the main portion of the first plate and having inner edge portions situated above the respective flanges, said third plate being situated between the main portion and the second plate without laminating the flanges.

5. A gasket according to claim 4, wherein said first sealing means is an inner bead, and said second sealing means is an outer bead.

6. A gasket according to claim 5, wherein said inner bead is formed on the second plate, and said outer bead is formed on the third plate.

7. A gasket according to claim 4, wherein said first sealing means is a wire ring, and said second sealing means is an emboss formed on the third plate.

8. A metal laminate type cylinder head gasket adapted to be installed in an engine with an open deck type cylinder block, said cylinder block having a plurality of cylinder walls for defining cylinder bores, a main body and a water passage for surrounding the cylinder walls inside the main body, said gasket comprising, first and second metal plates extending substantially throughout an entire area of the engine, and a third metal plate situated between the first and second metal plates, said first plate including a main portion, curved portions extending from the main portion to be situated on the cylinder walls for surrounding the respective cylinder bores and flanges extending from the respective curved portions in the directions away from the respective cylinder bores, said second plate being situated under the main portion of the first plate and having inner edge portions situated above the respective flanges, said third plate being situated between the main portion and the second plate without laminating the flanges, a plurality of inner beads located above the cylinder walls for sealing around the cylinder bores, said inner beads being formed on the second plate, an outer bead located above the main body for surrounding the water passage to seal therearound, said outer bead being formed on the third plate, and a thin metal plate situated between the metal plates and contacting one of outer surfaces of the third metal plate, said thin metal plate extending above the main body and being located only radially outside the outer bead relative to the cylinder bores for surrounding the water passage so that when the gasket is tightened, high surface pressure is formed on the main body outside the water passage to thereby securely seal outside the water passage.

9. A combination of a metal laminate type cylinder head gasket and an engine with an open deck type cylinder block, said gasket being disposed on the cylinder block when installed, said cylinder block including a plurality of cylinder walls for defining cylinder bores therein, said cylinder walls having bottom and side portions and being connected to each other at the side portions thereof, a main body surrounding the side portions of the cylinder walls and connected to the cylinder walls at the bottom portions, and a water passage defined between the main body and the side portions of the cylinder walls for entirely surrounding the side portions of the cylinder walls, and said gasket comprising;

first and second metal plates and a third metal plate situated between the first and second plates, said metal plates extending substantially over an entire sealing area of the engine, said first plate including a main portion, curved portions extending from the main portion to be situated on the cylinder walls for surrounding the respective cylinder bores and flanges extending from the respective curved portions in the directions away from the respective cylinder bores and located on the respective cylinder walls, said second plate being situated under the main portion of the first plate and having inner edge portions situated above the respective flanges, said third plate being situated between the main portion and the second plate without laminating the flanges, first sealing means situated between the flange and the main portion and adjacent the respective curved portions, said first sealing means being located above the respective cylinder walls for sealing therearound when the gasket is tightened, an outer bead formed on the third plate to be located above the main body for completely surrounding the water passage formed outside the cylinder walls to seal therearound, and a thin metal plate situated between the two metal plates, said thin metal plate extending above the main body and being located only radially outside the outer bead relative to the cylinder bores for surrounding the water passage so that when the gasket is tightened, high surface pressure is formed on the main body outside the water passage to thereby securely seal outside the water passage.

* * * * *